D. S. BAKER,
Heating-Stove.
No. 131,493.  Patented Sep. 24, 1872.
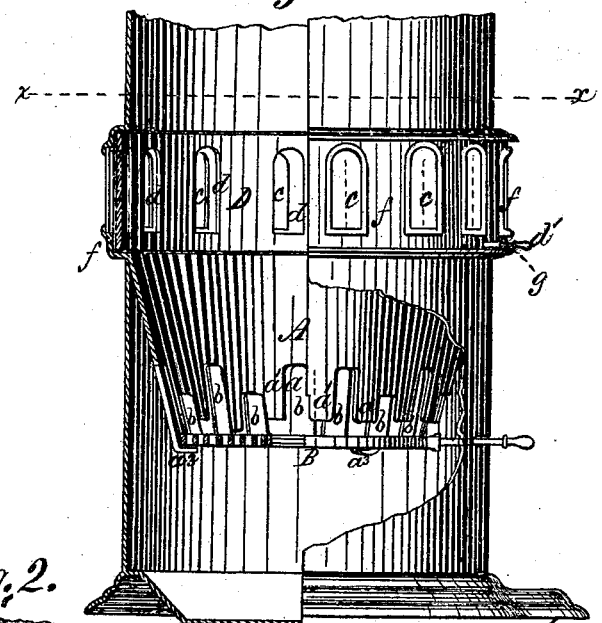
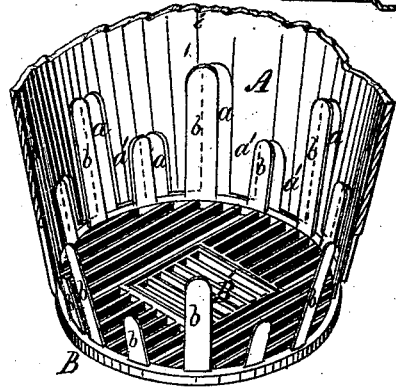
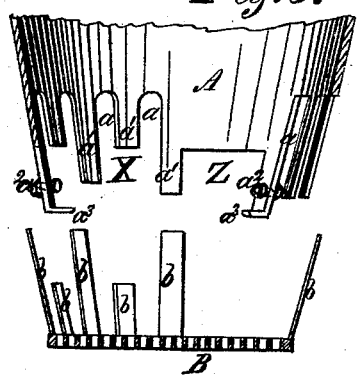
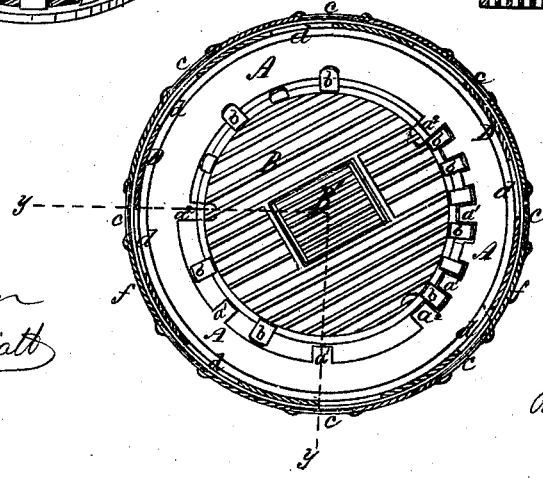
Witnesses:  Inventor:
Daniel S. Baker
Per Burke Fraser & Osgood
att'ys

UNITED STATES PATENT OFFICE.

DANIEL S. BAKER, OF EAST BLOOMFIELD, NEW YORK.

IMPROVEMENT IN HEATING-STOVES.

Specification forming part of Letters Patent No. 131,493, dated September 24, 1872.

*To all whom it may concern:*

Be it known that I, DANIEL S. BAKER, of East Bloomfield, in the county of Ontario and State of New York, have invented certain new and useful Improvements in Stoves, of which the following is a description:

My invention consists, first, of fingers or beaters projecting upward from the grate in and around the fire-pot, having slots or openings in its sides for the double purpose of preventing and destroying clinkers, &c., and regulating the horizontal draft; second, in supporting the grate in or to the fire-pot by or upon descending arms of the latter; third, in providing the grate, when so arranged within the fire-pot, with a trap or drop to allow the contents of the fire-pot to be dumped when necessary; and, lastly, in a cylinder or jacket placed inside and next to the section of the stove containing the mica windows, which latter it protects, when necessary, from being blackened or damaged from the inside, but having openings which, when brought in coincidence with the windows, allow the light to pass out through the latter.

In the drawing, Figure 1 is a sectional elevation of my arrangement in plane of line $y\,y$, Fig. 4; Fig. 2, a perspective view of the grate and a portion of the fire-pot in section, illustrating the arrangement for regulating the horizontal draft; Fig. 3, a sectional elevation of the fire-pot and grate, separated; and Fig. 4, a horizontal section in plane of line $x\,x$, Fig. 1, showing a plan of the fire-pot and grate.

The fire-pot A is placed in the stove in the ordinary manner; but, instead of being an unbroken cylinder, its lower portion is divided into longitudinal slots or openings $a\,a$ by downwardly-projecting arms $a^1\,a^1$, which latter, and, therefore, the openings, may be of uniform or varied length, as desired. The grate B is suspended at any convenient distance below the fire-pot by any number of these arms $a^2\,a^2$ that may be deemed desirable, it being immaterial as to the number or extent of the slots or openings $a\,a$ of the fire-pot. In the drawing the arms $a^2$ that support the grate are provided with horizontal lugs $a^3\,a^3$, upon which the latter rests, and is free to turn laterally. I prefer to extend the arms $a^1$ (excepting those supporting the grate) alternately about one-half and two-thirds the distance toward the grate, as shown at X, Fig. 3, so as to leave an unobstructed space above the grate for the escape of ashes, clinkers, &c., of about one-half the whole opening; but in some cases the opening may be made uniform, as at Z, Fig. 3, divided only by the arms supporting the grate. The number, form, and extent of the openings $a$ must be governed by the nature of the stove, as they afford not only a free escape for clinkers, stones, ashes, &c., to the ash-pit below, but also increase the draft-surface, and that, too, in an advantageous manner, as the oxygen of the atmosphere may be fed to the fire on all sides as well as beneath, thus insuring more perfect combustion of the fuel on the grate, or between the grate and the outlet of the magazine, where the latter is employed. In some cases the ordinary grate B may be dispensed with, and a simple flat or convex sheet of metal, of suitable form, substituted, the openings $a$ in the sides of the fire-pot being relied upon for the admission of sufficient air to support combustion. The extent of these openings, and, therefore, of the draft, may be varied at pleasure by the relative adjustment of the fingers $b$ of the grate B, extending upward from its periphery in and around the sides of the fire-pot, said fingers, in such case, (illustrated in Fig. 2,) being made to correspond in number and form with and close the openings $a$ when the grate is turned so as to bring them in coincidence. This provision is also of importance in preventing the premature escape of the fuel during the lighting of the fire. The fingers $b$ of the grate B perform another important office in the breaking up and dislodgment of the clinkers, lumps, &c., in the fire-pot when the grate is shaken laterally to sift the ashes, &c., into the ash-pit, and, at the same time, they insure and distribute a supply of fresh fuel to the fire. This portion of my device is fully set forth in my patent No. 77,707, dated March 12, 1868. The novelty in the present use of the fingers on the grate is their combination and operation with the openings $a$ of the fire-pot, as described. Where a simple plane-opening, $a$, is left, as at Z, Fig. 3, these fingers $b$ can be employed as bars or grating to retain the contents of the grate in place. Since the fingers $b$ prevent the dumping or turning of the grate vertically, a trap or drop, B', is held in the grate B, which admits of the contents of the fire-pot and magazine, being removed when necessary, and, in combination with the openings a of the fire-pot, enables the grate to be easily and quickly cleared. Above the fire-pot, inside and next to the portion of the stove-cylinder containing the ordinary mica windows c, is situated a cylinder or jacket, D, resting loosely so as to turn freely in the bulge f or offset of the cylinder formed at this point, or upon suitable flanges or guides arranged for its reception. This jacket or shield D may be formed in sections, or may consist of a complete, unbroken cylinder; and it is provided with longitudinal openings or slots d, corresponding in shape and size to the mica windows. The number of slots d is equal to that of the windows, and they are so arranged as to all come exactly opposite the windows when the jacket is turned (by means of the handle d' passing through the longitudinal slot g of the outer cylinder) to the proper degree, thus allowing the light from the interior to pass through the windows; but when the jacket D is turned so as to bring its body opposite the windows it not only intercepts the light, but effectually protects them from being blackened or smoked or sustaining any injury from the interior of the stove. This provision is of importance during the lighting of the fire, &c.

I am aware that this object has been attempted by placing a jacket or cylinder outside the stove-cylinder proper and placing the mica windows therein, so that by turning said jacket so as to bring the windows opposite or beyond corresponding openings in the stove-cylinder the mica might be exposed to or protected from the interior of the stove; but in this construction the joints between the parts are necessarily loose, and admit considerable quantities of cold air into the stove above the fire, impairing both draft and combustion and cooling the gases into smoke, all of which I avoid by placing the shield D inside, the only opening being the slot g, which is constantly covered by a follower, while the protection afforded the mica is complete.

I design to keep the grate steady and prevent the contact of its fingers with the interior of the fire-pot by means of guides or flanges, which I prefer to form by passing bolts through the sides of the fire-pot at the proper position with regard to the grate, with their heads inside to form the guides, in which position they are secured by nuts on the outside.

What I claim as my invention is—

1. Supporting the grate B in or to the bottom of the fire-pot by means of its descending arms $a^1$, substantially as set forth.

2. The combination of the fingers b of the grate B with the slots a of the fire-pot A, for the purpose set forth.

3. In combination with the fingers b and fire-pot A, the trap or drop B', suspended in the grate B in any desirable manner.

4. The cylindrical shield D, situated behind the windows and in the interior of the stove-cylinder, and provided with the openings c, for the purpose described.

In witness whereof I have hereunto signed my name in the presence of two subscribing witnesses.

DANIEL S. BAKER.

Witnesses:
WHEELER W. PHILLIPS,
GEO. W. MIATT.